United States Patent [19]

Hasegawa et al.

[11] Patent Number: 5,677,378
[45] Date of Patent: Oct. 14, 1997

[54] POLYPROPYLENE LINING

[75] Inventors: Shigeo Hasegawa; Takafumi Shimada; Ryuji Yoshiyama; Kenji Iwasaki, all of Hiroshima; Tatsuyuki Nishikawa, Tokyo; Takayoshi Kawaoka, Hiroshima, all of Japan

[73] Assignee: Mitsubishi Jukogyo Kabushiki Kaisha, Tokyo, Japan

[21] Appl. No.: 746,138

[22] Filed: Nov. 6, 1996

Related U.S. Application Data

[62] Division of Ser. No. 527,092, Sep. 12, 1995, abandoned, which is a division of Ser. No. 285,998, Aug. 4, 1994, abandoned, which is a division of Ser. No. 184,290, Jan. 21, 1994, abandoned.

[30] Foreign Application Priority Data

| Jan. 21, 1993 | [JP] | Japan | 5-8488 |
| May 13, 1993 | [JP] | Japan | 5-111473 |
| Jun. 14, 1993 | [JP] | Japan | 5-141760 |
| Nov. 9, 1993 | [JP] | Japan | 5-279138 |
| Nov. 9, 1993 | [JP] | Japan | 5-279139 |

[51] Int. Cl.$^6$ ..................................................... B05D 1/00
[52] U.S. Cl. ............................ 525/74; 525/78; 427/195; 427/202; 427/203; 428/461; 106/14.41
[58] Field of Search ......................... 525/74, 78; 427/195, 427/202, 203, 239, 331, 384, 409; 428/461

[56] References Cited

U.S. PATENT DOCUMENTS

| 3,932,368 | 1/1976 | McConnell et al. | 525/285 |
| 4,237,037 | 12/1980 | Takahashi | 525/74 |
| 4,455,344 | 6/1984 | Matsuyama et al. | 428/327 |
| 4,506,056 | 3/1985 | Gaylord | 525/285 |
| 4,606,953 | 8/1986 | Suzuki et al. | 428/36 |
| 4,675,210 | 6/1987 | Clayton et al. | 428/208.2 |
| 4,957,968 | 9/1990 | Adur et al. | 525/74 |
| 5,091,260 | 2/1992 | Wong | 428/461 |
| 5,185,398 | 2/1993 | Kehr et al. | 525/74 |
| 5,202,192 | 4/1993 | Hope et al. | 428/475.8 |
| 5,256,226 | 10/1993 | Marzola et al. | 156/95 |

FOREIGN PATENT DOCUMENTS

| 0 360 646 | 3/1990 | European Pat. Off. . |
| 0 370 786 | 5/1990 | European Pat. Off. . |
| 62-273083A | 11/1987 | Japan . |
| 2 097 809 | 11/1982 | United Kingdom . |

OTHER PUBLICATIONS

JP 58107334, Jun., 1983, Orbit Database Abstract.

*Primary Examiner*—Mark L. Warzel
*Attorney, Agent, or Firm*—Fish & Richardson P.C.

[57] ABSTRACT

A lining for a metal, a lining powder and a lining resin composition which comprise a mixture of a maleic acid-modified polypropylene and a polypropylene, or a mixture of the above-mentioned mixture and an ethylene propylene rubber and/or an antioxidant; and a lining method.

4 Claims, 1 Drawing Sheet

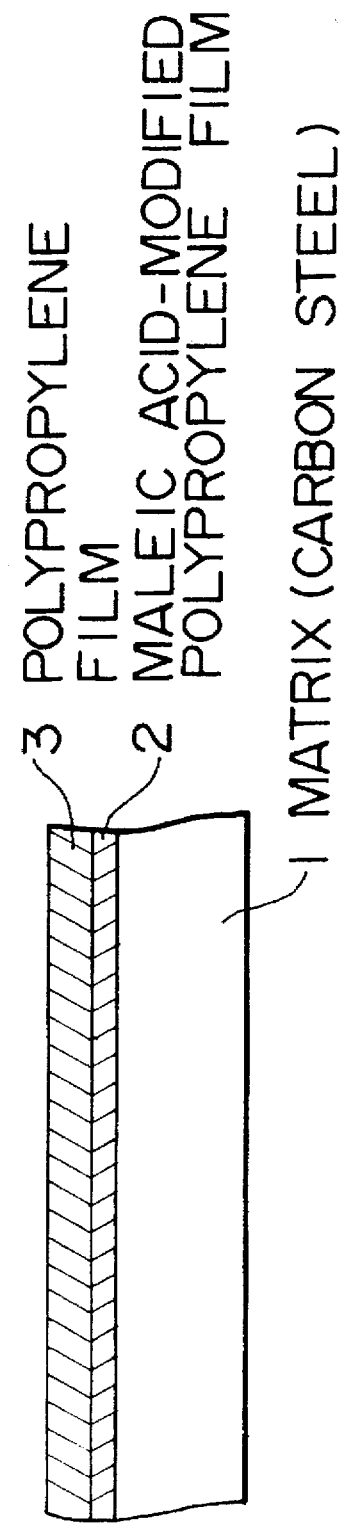

POLYPROPYLENE LINING

This is a divisional application of application Ser. No. 08/527,092, filed Sep. 12, 1995, now abandoned, which is a division of application Ser. No. 08/285,998, filed Aug. 4, 1994, now abandoned, which is a division of application Ser. No. 08/184,290, filed Jan. 21, 1994, now abandoned.

FIELD OF THE INVENTION AND RELATED ART STATEMENT

The present invention relates to a heated/melted polypropylene lining, a lining powder, a polypropylene resin composition for lining and a method for preparing the polypropylene lining, which are applicable to metal (carbon steel) materials for use in an exhaust gas desulfurization device, a gas purification plant, a seawater-fresh water converter, a thermal power plant and the like.

Heretofore, as the polypropylene lining, there is known the so-called sheet lining in which the surface of a sheet or a pipe of the polypropylene is treated by corona discharge or with a mixed solution of concentrated sulfuric acid and chromic acid to impart adhesive properties to the surface, coated with an adhesive such as an epoxy resin, and then stuck on a material to be lined. However, the so-called heated/melted polypropylene lining has not been suggested at all in which a material to be lined is heated up to a temperature more than the melting point of the polypropylene, and the heated surface of the material is then sprinkled with a polypropylene powder to form a film thereon, as in the case of the lining of a polyethylene and a fluororesin. In addition, there has been neither marketed nor suggested a lining powder for heated/melted polypropylene lining in which a material to be lined is sprinkled with the powder, and this powder is then heated/melted.

Furthermore, there have not been suggested a polypropylene sheet lining in which a material to be lined is heated up to a temperature more than the melting point of a polypropylene, a sheet or a stick of the polypropylene having adhesive properties is then fused to the heated surface of the material to form a lining and to thereby secure the adhesion of the polypropylene sheet or stick to the metal.

In addition, another lining method has not been suggested at all in which a metal surface is sprinkled with a polypropylene powder, and the powder is then heated/melted, and then cooled/solidified.

The above-mentioned polypropylene lining, in which the surface of a sheet or a pipe is treated, coated with an adhesive, and then used for lining, has the following problems, and so it is scarcely applied on an industrial scale:

(1) Since the adhesive is used for the lining, a defect such as an adhesive failure tends to occur.

(2) The polypropylene sheet or pipe is pressed against a material to be lined by worker's hands or by the use of a suitable tool to achieve the adhesion, and therefore it is difficult to apply the polypropylene lining to a material having a complicate shape such as a bent portion of a pipe or a T-shaped pipe, or a material having a small diameter.

(3) When metal pipes are lined, polypropylene pipes which have been previously extruded by an extruder are used. Therefore, in a plant in which the metal pipes having various diameters are used, the polypropylene pipes which are fit for the diameters of these metal pipes are required. Thus, for the manufacture of these polypropylene pipes having the various diameters, many molds are necessary, which increases the cost of the polypropylene pipes.

In general, the polypropylene has been used for injection-molded articles, extruded articles, films and the like, but the commercially available polypropylene can adhere to the metal surface while it is in a heated/melted state, but it peels therefrom inconveniently when it is cooled/solidified. Therefore, as described above, one of the polypropylene lining techniques has been only put to practical use, and this practical polypropylene lining comprises treating the surface of the extruded sheet or pipe to modify the surface, i.e., to impart adhesive properties to the surface, and then lining a metal material with the sheet or the pipe by the use of an adhesive.

As described above, the commercially available polypropylene cannot be stuck on the metal material by a heating/melting method, because the solidification shrinkage ratio of the polypropylene is large; creep stress caused by the case where the solidification shrinkage remains for a long period of time even at a relatively low temperature (ordinary temperature) is much larger than when a polyethylene or a fluororesin is used; and there is the influence of an additive such as an aggregate which is added to the polypropylene in order to improve mold release properties in the step of the injection molding or the extrusion, but detail factors are indefinite.

OBJECT AND SUMMARY OF THE INVENTION

In view of the above-mentioned technical level, the present invention has been completed, and an object of the present invention is to provide a heated/melted polypropylene lining material and its lining powder which can maintain excellent chemical resistance, heat resistance and mechanical properties of the polypropylene and which has excellent adhesive properties.

Another object of the present invention is to provide a lining material and its lining powder for metals which can maintain excellent chemical resistance, heat resistance and mechanical properties of the polypropylene and which can inhibit the deterioration of the resin.

Still another object of the present invention is to provide a polypropylene resin composition for lining which can maintain excellent chemical resistance, heat resistance and mechanical properties of the polypropylene and which has excellent adhesive properties, and a method for preparing this composition.

A further object of the present invention is to provide a method for extremely simply lining a metal (carbon steel) with a polypropylene.

The present inventors have intensively conducted experiments and investigations with the intention of developing a heated/melted polypropylene lining technique using a powder which can be applied to metal materials or similar materials having intricate shapes as well as large and small diameters, and as a result, they have found that after a heating/melting step, the polypropylene, when used singly, peels at the time of cooling/solidification, but when the polypropylene is mixed with a maleic acid-modified polypropylene in a suitable ratio, the resin does not peel to obtain a good lining film having strong adhesive force.

That is, the inventions are directed to:

(1) a polypropylene lining characterized by comprising a heated/melted mixture of a maleic acid-modified polypropylene and a polypropylene in a weight ratio of the maleic acid-modified polypropylene/the polypropylene=10/1 to 1/10, (2) a polypropylene lining powder characterized by comprising a mixture of a maleic acid-modified polypropylene powder having an average particle diameter of 500 μm or less and a polypropylene powder in a weight ratio of the maleic acid-modified polypropylene powder/the polypropylene powder=10/1 to 1/10, and (3) a polypropylene lining powder obtained by melting and kneading a mixture of a maleic acid-modified polypropylene and a polypropylene in a weight ratio of the maleic acid-modified polypropylene/the polypropylene=10/1 to 1/10, and then milling the mixture so that an average particle diameter may be 500 μm or less.

A metal which is useful in applying the present inventions is usually carbon steel. Furthermore, the content of maleic acid in the maleic acid-modified polypropylene which can be used in the present invention is 0.05 wt% or more, preferably in the range of from 0.1 to 1.0 wt%.

In the present invention, a mixing ratio of the maleic acid-modified polypropylene to the polypropylene depends upon the kind and the grade of selected maleic acid-modified polypropylene and polypropylene. If the mixing ratio of the maleic acid-modified polypropylene is too high, chemical resistances such as acid resistance and alkali resistance deteriorate, and if it is too low, adhesive force declines and the lining tends to peel. Hence, the proper mixing ratio is in the range of from 10/1 to 1/10.

With regard to the particle diameter of the powder suitable for the heated/melted lining, if it is less than 500 μm or less, a film having a uniform thickness can be obtained, but preferably, it is in the range of from 100 to 300 μm. Even if the powder having an average particle diameter of more than 500 μm is used, the lining film can be formed, but a long time is taken to melt the powder for the film formation, and the surface of the film becomes a rough state, which makes it impossible to form the lining film having a uniform thickness.

The lining material of the present invention is formed from the maleic acid-modified polypropylene and the polypropylene in a weight ratio of from 10/1 to 1/10. When the lining material is in a heated/melted state, both of these components are melted, and when the lining material is cooled/solidified, a carbonyl group contained in the maleic acid-modified polypropylene is strongly bonded to a metal, whereby the lining film having strong adhesive force can be obtained.

The heated/melted polypropylene lining material and the lining powder can be provided which can be applied to a high-temperature region to which a conventional polyethylene lining and rubber lining cannot be applied. In addition, this lining powder is excellent in chemical resistance and can also be applied to pipes having a complicate shape and different diameters.

Heretofore, in a device which is used in a high-temperature region and in severely corrosive circumstance to which the polyethylene lining and the rubber lining cannot be applied, a precious high-grade stainless steel or an expensive fluororesin-based lining material has been used. The polypropylene lining material and the lining powder of the present invention can be applied to such a device under the severe conditions, and the raw materials of the lining material and the powder are the fairly inexpensive maleic acid-modified polypropylene and polypropylene. Thus, the very inexpensive lining material and powder can be provided, and they have large values from industrial and economical viewpoints.

Furthermore, the present inventors have found that a good lining film which does not peel and which has strong adhesive force can be obtained by mixing a modified polypropylene and an ethylene propylene rubber with a polypropylene in a suitable ratio.

That is, the inventions are directed to:

(1) a polypropylene lining for a metal characterized by comprising a heated/melted mixture of 1 to 20 wt% of an ethylene propylene rubber and a mixture of a maleic acid-modified polypropylene and a polypropylene in a weight ratio of the maleic acid-modified polypropylene/the polypropylene=10/1 to 1/100, (2) a polypropylene lining powder obtained by adding 1 to 20 wt% of an ethylene propylene rubber powder having an average particle diameter of 500 μm or less to a mixture of a maleic acid-modified polypropylene powder having an average particle diameter of 500 μm or less and a polypropylene powder in a weight ratio of the maleic acid-modified polypropylene powder/the polypropylene powder=10/1 to 1/100, and then mixing them, and (3) a polypropylene lining powder obtained by adding 1 to 20 wt% of an ethylene propylene rubber to a mixture of a maleic acid-modified polypropylene and a polypropylene in a weight ratio of the maleic acid-modified polypropylene/the polypropylene=10/1 to 1/100, mixing them, melting and kneading the mixture, and then milling the same so that an average particle diameter may be 500 μm or less.

A metal which is useful in applying the present inventions is usually carbon steel. Furthermore, the content of maleic acid in the maleic acid-modified polypropylene which can be used in the present invention is 0.01 wt% or more, preferably in the range of from 0.1 to 1.0 wt%.

The content of the propylene in the ethylene propylene rubber which can be used in the present invention is usually in the range of from 10 to 40 wt%. In the present invention, a mixing ratio of the maleic acid-modified polypropylene to the polypropylene depends upon the kind and the grade of selected maleic acid-modified polypropylene and homopolypropylene, but the proper mixing ratio is in the range of from 10/1 to 1/100. The higher the mixing ratio of the maleic acid-modified polypropylene is, the stronger the adhesive force of the lining to the metal is. A ratio of the ethylene propylene rubber which is mixed with the above-mentioned mixture depends upon the kind and the grade of selected ethylene propylene rubber, but the proper mixing ratio is in the range of from 1 to 20 wt%. If the mixing ratio of the ethylene propylene rubber is too high, the strength of the lining declines.

Moreover, if the particle diameter of the powder suitable for the heated/melted lining is 500 μm or less, the film having a uniform thickness can be formed. Even if the powder having the average particle diameter more than 500 μm is used, the lining film can be formed, but a long time is taken to melt the powder for the film formation, and the surface of the film becomes a rough state, which makes it impossible to form the lining film having the uniform thickness.

The lining material of the present invention can be formed from the substance in which 1 to 20 wt% by outer percentage of the ethylene propylene rubber is added to the mixture of the maleic acid-modified polypropylene and the polypropylene in a weight ratio of the maleic acid-modified polypropylene/the polypropylene=10/1 to 1/100. When the lining material is in a heated/melted state, both of the maleic acid-modified polypropylene and the polypropylene are melted, and when the lining material is cooled/solidified, a carbonyl group contained in the maleic acid-modified polypropylene is strongly bonded to a metal, whereby the lining film having strong adhesive force can be obtained.

On the other hand, when the lining material comprising the substance in which the ethylene propylene rubber is added to the mixture of the maleic acid-modified polypropylene and the polypropylene is in the heated and melted state, the maleic acid-modified polypropylene, the polypropylene and the ethylene propylene rubber are melted. The mixture of the maleic acid-modified polypropylene and the polypropylene (hereinafter referred to as "modified polypropylene" sometimes) is different from the ethylene propylene rubber in fluidity and solidification temperature, and therefore, when the lining material is cooled/solidified, the ethylene propylene rubber is solidified in a dispersed state in the modified polypropylene.

Since the creep stress of the ethylene propylene rubber is very small, the ethylene propylene rubber stretches at the time of solidification shrinkage and the stress is instantly relived to a level smaller than adhesive force. Hence, the lining which does not peel can be obtained.

In the lining powder for obtaining the lining of the present invention, the ethylene propylene rubber is added to the modified polypropylene, and therefore, owing to the stress relief function of the ethylene propylene rubber, the amount of the maleic acid-modified polypropylene can be reduced, as compared with a case where no ethylene propylene rubber is added.

The lining powder of the present invention can be melted and kneaded by the use of a melting kneader, and then milled so that an average particle diameter may be 500 μm or less to obtain a fine lining powder having the further improved adhesive properties. The mixing state of the thus obtained fine lining powder is more uniform than the mixture of the modified polypropylene, the ethylene propylene rubber having the small particle diameter.

Furthermore, the present inventors have found that when an antioxidant is added to an adhesive polypropylene prepared by mixing a polypropylene with a modified polypropylene and an ethylene propylene rubber, a tough film having good surface properties can be obtained without impairing adhesive properties and without deteriorating the resins.

That is, the inventions are directed to:

(1) a polypropylene lining for a metal characterized by comprising the steps of adding 1 to 20 wt% of an ethylene propylene rubber to a mixture of a maleic acid-modified polypropylene and a polypropylene in a weight ratio of the maleic acid-modified polypropylene/the polypropylene= 10/1 to 1/100, further adding 0.1 to 1.0 wt% of an antioxidant to the mixture, heating/melting the resulting powder, and then cooling/solidifying the same to form a lining layer, (2) a polypropylene lining powder obtained by adding 1 to 20 wt% of an ethylene propylene rubber powder having an average particle diameter of 500 μm or less to a mixture of a maleic acid-modified polypropylene powder having an average particle diameter of 500 μm or less and a polypropylene powder having an average particle diameter of 500 μm or less in a weight ratio of the maleic acid-modified polypropylene powder/the polypropylene powder=10/1 to 1/100, further adding 0.1 to 1.0 wt% of an antioxidant to the mixture, and then mixing them, and (3) a polypropylene lining powder obtained by adding 1 to 20 wt% of an ethylene propylene rubber to a mixture of a maleic acid-modified polypropylene and a polypropylene in a weight ratio of the maleic acid-modified polypropylene/ the polypropylene=10/1 to 1/100, further adding 0.1 to 1.0 wt% of an antioxidant to the mixture, melting and kneading the resulting mixture, and then milling the same so that an average particle diameter may be 500 μm or less.

A metal which is useful in applying the present inventions is usually carbon steel.

The content of maleic acid in the maleic acid-modified polypropylene which can be used in the present invention is 0.01 wt% or more, preferably in the range of from 0.1 to 1.0 wt%.

The content of the propylene in the ethylene propylene rubber which can be used in the present invention is usually in the range of from 10 to 40 wt%. Moreover, in the present invention, the melt flow rate of the polypropylene is preferably between 0.1 and 40.

In the present invention, a mixing ratio of the maleic acid-modified polypropylene to the polypropylene depends upon the kind of selected maleic acid-modified polypropylene and polypropylene, but the proper mixing ratio is in the range of from 10/1 to 1/100. The higher the mixing ratio of the maleic acid-modified polypropylene is, the stronger the adhesive force of the lining to the metal is. A ratio of the ethylene propylene rubber which is mixed with the above-mentioned mixture depends upon the kind of selected ethylene propylene rubber, but the proper mixing ratio is in the range of from 1.0 to 20 wt%. If the mixing ratio of the ethylene propylene rubber is too high, the strength of the lining declines.

In the present invention, preferable examples of the antioxidant include high-molecular weight phenol-based antioxidants and phosphites (and phosphonites), and the amount of the antioxidant to be used depends upon the kind of antioxidant, but the proper amount is in the range of from 0.1 to 1.0 wt% by outer percentage based on the weight of the modified polypropylene.

A typical example of the antioxidant is a combination of a phosphorus-based working stabilizer such as tris(2,4-di-t-butylphenyl) phosphite and at least one selected from the group consisting of hindered phenol-based pentaerythrityltetrakis[3-(3,5-di-t-butyl-4-hydroxyphenyl) propionate], octadecyl-3-(3,5-di-t-butyl-4-hydroxyphenyl) propionate, 1,3,5-trimethyl-2,4,6-tris(3,5-di-t-butyl-4-hydroxybenzyl)benzene and tris-(3,5-di-t-butyl-4-hydroxybenzyl) isocyanurate.

If the particle diameter of the powder is 500 μm or less suitable for the heated/melted lining, a film having a uniform thickness can be obtained. Even if the powder having the particle diameter larger than this size is used, the lining film can be formed, but a long time is taken to melt the powder for the film formation, and the surface of the film becomes a rough state, which makes it impossible to form the lining film having the uniform thickness.

The lining material of the present invention can be formed by adding 1.0 to 20 wt% of the ethylene propylene rubber to the mixture of the maleic acid-modified polypropylene and the polypropylene in a weight ratio of the maleic acid-modified polypropylene/the polypropylene=10/1 to 1/100, and further adding the antioxidant to the mixture. When the lining material is in a heated/melted state, both of the maleic acid-modified polypropylene and the polypropylene are melted, and when the lining material is cooled/solidified, a carboxyl group contained in the maleic acid-modified polypropylene is strongly bonded to a metal, whereby the lining film having strong adhesive force can be obtained.

On the other hand, when the lining material is in a heated/melted state, the ethylene propylene rubber added to the mixture of the maleic acid-modified polypropylene and the polypropylene is melted in the polypropylene, and when the lining material is cooled/solidified, the ethylene propylene rubber is dispersed in the polypropylene and the modified polypropylene, because the maleic acid-modified polypropylene, the polypropylene and the ethylene propylene rubber are different from each other in fluidity and solidification temperature. Since the creep deformation stress of the ethylene propylene rubber is very small, the ethylene propylene rubber stretches at the time of solidification shrinkage and the stress is instantly relived to a level smaller than adhesive force. Hence, the lining which does not peel can be obtained.

In addition, the antioxidant has a function for inhibiting the main chain of the polypropylene from thermally decomposing, and therefore the employment of the antioxidant permits thermal deterioration in the heating/melting step to decrease. In the lining powder of the present invention the antioxidant is added to the mixture of the polypropylene, the modified polypropylene and the ethylene propylene rubber, so that the thermal deterioration can be inhibited in the heating/melting step and so a tough film can be formed.

The lining powder of the present invention can be melted and kneaded by the use of a melting kneader, and then milled so that an average particle diameter may be 500 μm or less to obtain a fine lining powder having the further improved adhesive properties. The mixing state of the thus obtained fine lining powder is more uniform than the mixture of the modified polypropylene, the ethylene propylene rubber and the antioxidant having the small particle diameter.

Furthermore, the present inventors have intensively conducted experiments and investigations with the intention of developing a lining material which can be manufactured from a polypropylene sheet or a polypropylene stick having good adhesive properties, and as a result, they have found that when an antioxidant is added to an adhesive polypropylene prepared by mixing a polypropylene with a modified polypropylene and an ethylene propylene rubber, a tough film having good surface properties can be obtained without impairing adhesive properties and without deteriorating the resins.

That is, the inventions are directed to:

(1) a polypropylene lining sheet or stick comprising a resin composition obtained by adding 1 to 20 wt% of an ethylene propylene rubber to a mixture of a maleic acid-modified polypropylene and a polypropylene in a weight ratio of the maleic acid-modified polypropylene/the polypropylene=10/1 to 1/100, and further adding 0.1 to 1.0 wt% of an antioxidant to the mixture, and (2) a polypropylene lining method characterized by comprising the step of thermally fusing a sheet or a stick of a polypropylene resin composition of the above-mentioned (1) to a member to be lined.

The content of maleic acid in the maleic acid-modified polypropylene which can be used in the present invention is 0.01 wt% or more, preferably in the range of from 0.1 to 1.0 wt%.

The content of the propylene in the ethylene propylene rubber which can be used in the present invention is usually in the range of from 10 to 40 wt%. Moreover, in the present invention, the melt flow rate of the polypropylene is preferably between 0.1 and 40.

The sheet of the polypropylene resin composition according to the present invention is linable on the surface of a metal irrespective of its thickness, and when the sheet is thermally fused on the metal, a film having good adhesive properties can be formed. Furthermore, the stick of the polypropylene resin composition according to the present invention is linable on the surface of a metal irrespective of its thickness, and when the stick is arranged in one direction and thermally fused on the metal, a film having good adhesive properties can be formed. Thus, the stick is applicable for the repair of the lining.

The sheet or the stick of the polypropylene resin composition of the present invention can be fused on the surface of a metal to obtain a lining film having good adhesive properties to the metal.

Furthermore, the inventions are directed to:

(1) a lining method of a polypropylene characterized by comprising the steps of sprinkling the surface of a metal with a maleic acid-modified polypropylene powder, heating/melting the powder, sprinkling the melted maleic acid-modified polypropylene powder layer with a polypropylene powder, heating/melting the powder, and then cooling/solidifying the same to form a lining layer of the polypropylene, and (2) a lining method of a polypropylene characterized by comprising the steps of sprinkling the surface of a metal with a maleic acid-modified polypropylene powder, heating/melting the powder, cooling/solidifying the same, sprinkling the resulting maleic acid-modified polypropylene film layer with a polypropylene powder, heating/melting the powder, and then cooling the same to form a lining layer of the polypropylene.

The content of maleic acid in the maleic acid-modified polypropylene which can be used in the inventions in claims 12 and 13 is 0.05% or more, preferably in the range of from 0.1 to 1.0%.

The maleic acid-modified polypropylene has a carbonyl group, and if heated/melted and then cooled/solidified, the maleic acid-modified polypropylene can be bonded to a metal. Thus, the present invention intends that the maleic acid-modified polypropylene film layer is first formed on the surface of the metal, and the polypropylene film is then formed on the maleic acid-modified polypropylene film layer.

The maleic acid-modified polypropylene has compatibility with the polypropylene, and so they can be bonded to each other by the heating/melting. Thus, the polypropylene lining of the present invention having the polypropylene film on its outer periphery can be obtained.

The film layer of the maleic acid-modified polypropylene interposed between the metal surface and the polypropylene film layer is preferably as thin as possible in order to improve the heat resistance of the polypropylene film. However, the minimum thickness of the film layer of the maleic acid-modified polypropylene depends upon the particle diameter of the maleic acid-modified polypropylene powder to be used for the film formation, and so the practical thickness of the film layer is in the range of from 50 to 200 μm.

BRIEF DESCRIPTION OF THE DRAWING

FIG. 1 is a sectional view of a matrix lined with a polypropylene.

DETAILED DESCRIPTION OF PREFERRED EMBODIMENTS

A preferable embodiment of the inventions will be described.

The pellets of a maleic acid-modified polypropylene having a maleic acid modification ratio of from 0.01 to 1.0 wt% and the pellets of a polypropylene having a melt flow index of 1.0 were separately milled by means of a refrigeration mill using liquid nitrogen, and each powder was classified by sieves into portions having average particle diameters of 1,000 μm, 500 μm, 300 μm and 100 μm. Afterward, the maleic acid-modified polypropylene powder was mixed with the polypropylene powder in blend ratios in Table 1 to obtain lining powders.

Furthermore, the pellets of the above-mentioned maleic acid-modified polypropylene was mixed with the pellets of the above-mentioned polypropylene in blend ratios shown in Table 1, and each mixture was then kneaded by means of a melting kneader, milled by the refrigeration mill, and then classified by the sieves to obtain lining powders having average particle diameters of 1,000 μm, 500 μm, 300 μm and 100 μm.

Next, a 70-mm-long, 200-mm-wide, 5-mm-thick carbon steel plate was degreased, shot-blasted, heated on a heated plate so that its surface temperature might be 250°±20° C., sprinkled with the above-mentioned powder, and then heated/melted to obtain a lined steel plate having a film thickness of 1.5 mm. Afterward, the observation of the surface state of each lining, the measurement of adhesive force by a 90° peel method in a wide of 10 mm, and a durability test for 6 months under conditions of 5% $H_2SO_4$ and 100° were carried out. The results are set forth in Table 1.

TABLE 1

| No. | Kind of Lining Powder | Maleic Acid Modification Ratio of Maleic Acid-Modified Polypropylene (%) | Weight Ratio of Maleic Acid-Modified Polypropylene to Polypropylene |
|---|---|---|---|
| 1 | Mixed powder | 0.01 | 10/1 |
| 2 | " | 0.05 | 1/1 |
| 3 | " | 0.5 | 1/5 |
| 4 | " | 1.0 | 1/10 |
| 5 | " | 0.5 | 20/1 |
| 6 | " | 0.5 | 1/20 |
| 7 | " | 0.5 | 1/5 |
| 8 | " | 0.5 | 1/5 |
| 9 | " | 0.5 | 1/5 |

| No. | Average Particle Diameter of Lining Powder (μm) | Surface State after Lining | Adhesive Force (kgf/10 mm width) | State after Durability Test |
|---|---|---|---|---|
| 1 | 500 | Good | 4 | Color changed slightly |
| 2 | 500 | " | 7 | No problem |
| 3 | 500 | " | 8 | " |
| 4 | 500 | " | 7 | " |
| 5 | 300 | " | 12 | Color changed, fine cracks occurred |
| 6 | 300 | Peeled | — | — |
| 7 | 300 | Good | 10 | No problem |
| 8 | 100 | " | 11 | " |
| 9 | 1000 | Rough | 6 | " |

| No. | Kind of Lining Powder | Maleic Acid Modification Ratio of Maleic Acid-Modified Polypropylene (%) | Weight Ratio of Maleic Acid-Modified Polypropylene to Polypropylene |
|---|---|---|---|
| 10 | Melted & kneaded | 0.01 | 10/1 |
| 11 | Melted & kneaded | 0.05 | 1/1 |
| 12 | Melted & kneaded | 0.5 | 1/5 |
| 13 | Melted & kneaded | 1.0 | 1/10 |
| 14 | Melted & kneaded | 0.5 | 20/1 |
| 15 | Melted & kneaded | 0.5 | 1/20 |
| 16 | Melted & kneaded | 0.5 | 1/5 |
| 17 | Melted & kneaded | 0.5 | 1/5 |
| 18 | Melted & kneaded | 0.5 | 1/5 |

| No. | Average Particle Diameter of Lining Powder (μm) | Surface State after Lining | Adhesive Force (kgf/10 mm width) | State after Durability Test |
|---|---|---|---|---|
| 10 | 500 | Good | 5 | Color changed slightly |
| 11 | 500 | " | 8 | No problem |
| 12 | 500 | " | 10 | " |
| 13 | 500 | " | 9 | " |
| 14 | 300 | " | 12 | Color changed, fine cracks occurred |
| 15 | 300 | Peeled | — | — |
| 16 | 300 | Good | 11 | No problem |
| 17 | 100 | " | 12 | " |
| 18 | 1000 | Rough | 7 | " |

A preferable embodiment of the inventions will be described.

The pellets of a maleic acid-modified polypropylene having a maleic acid modification ratio of from 0.01 to 1.0 wt%, the pellets of a polypropylene having a melt flow index of 1.0 and the pellets of an ethylene propylene rubber having a polypropylene content of from 10 to 40% were separately milled by means of a refrigeration mill using liquid nitrogen, and each powder was classified by sieves into portions having average particle diameters of 1,000 μm, 500 μm and 100 μm. Afterward, the resulting powders were mixed in blend ratios in Table 2 to obtain lining powders.

Furthermore, the pellets of the above-mentioned maleic acid-modified polypropylene, the above-mentioned polypropylene and the above-mentioned ethylene propylene rubber were mixed in blend ratios shown in Table 2, and each mixture was then kneaded by means of a melting kneader, milled by the refrigeration mill, and then classified by the sieves to obtain lining powders having average particle diameters of 1,000 μm, 500 μm and 100 μm.

Next, a 70-mm-long, 200-mm-wide, 5-mm-thick carbon steel plate was degreased, shot-blasted, heated on a heated plate so that its surface temperature might be 250°±20° C., sprinkled with the above-mentioned powder, and then heated/melted to obtain a lined steel plate having a film thickness of 1.5 mm. Afterward, the observation of the surface state of each lining, the measurement of adhesive force by a 90° peel method in a wide of 10 mm, and a durability test for 6 months under conditions of 5% $H_2SO_4$ and 100° were carried out. The results are set forth in Table 2.

TABLE 2

| No. | Kind of Lining Powder | Maleic Acid Modification Ratio of Maleic Acid-modified Polypropylene (%) | Propylene Content in Ethylene Propylene Rubber (%) | Weight Ratio of Maleic Acid-Modified Polypropylene/ Ethylene Propylene Rubber/ Polypropylene |
|---|---|---|---|---|
| 1 | Mixed powder | 0.01 | 25 | 1/0.4/1 |
| 2 | " | 0.05 | 25 | 1/0.4/1 |
| 3 | " | 0.10 | 25 | 1/0.4/1 |
| 4 | " | 0.50 | 25 | 1/0.4/1 |
| 5 | " | 1.00 | 25 | 1/0.4/1 |
| 6 | " | 0.50 | 10 | 1/0.4/1 |
| 7 | " | 0.50 | 40 | 1/0.4/1 |
| 8 | " | 0.50 | 25 | 1/0.2/1 |
| 9 | " | 0.50 | 25 | 1/0.025/1 |
| 10 | " | 0.50 | 25 | 10/1.2/1 |
| 11 | " | 0.50 | 25 | 5/0.7/1 |
| 12 | " | 0.50 | 25 | 1/0.21/1 |

| No. | Average Particle Diameter of Lining Powder (μm) | Surface State after Lining | Adhesive Force (kgf/10 mm φ) | State after Durability Test |
|---|---|---|---|---|
| 1 | 100 | Good | 4 | No problem |
| 2 | 100 | " | 11 | " |
| 3 | 100 | " | 13 | " |
| 4 | 100 | " | 14 | " |
| 5 | 100 | " | 16 | " |
| 6 | 100 | " | 12 | " |
| 7 | 100 | " | 11 | " |
| 8 | 100 | " | 12 | " |
| 9 | 100 | " | 14 | " |
| 10 | 100 | " | 17 | " |
| 11 | 100 | " | 15 | " |
| 12 | 100 | " | 14 | " |

TABLE 2-continued

| No. | Kind of Lining Powder | Maleic Acid Modification Ratio of Maleic Acid-modified Polypropylene (%) | Propylene Content in Ethylene Propylene Rubber (%) | Weight Ratio of Maleic Acid-Modified Polypropylene/ Ethylene Propylene Rubber/ Polypropylene |
|---|---|---|---|---|
| 13 | Mixed powder | 0.50 | 25 | 1/1.2/10 |
| 14 | " | 0.50 | 25 | 1/5.7/50 |
| 15 | " | 0.50 | 25 | 1/12.2/100 |
| 16 | " | 0.05 | 25 | 1/23.3/200 |
| 17 | " | 0.50 | 25 | 1/1.2/10 |
| 18 | " | 0.50 | 25 | 1/1.2/10 |
| 19 | Melted & kneaded | 0.01 | 25 | 1/0.4/1 |
| 20 | Melted & kneaded | 0.05 | 25 | 1/0.4/1 |
| 21 | Melted & kneaded | 0.10 | 25 | 1/0.4/1 |
| 22 | Melted & kneaded | 0.50 | 25 | 1/0.4/1 |
| 23 | Melted & kneaded | 1.00 | 25 | 1/0.4/1 |
| 24 | Melted & kneaded | 0.50 | 10 | 1/0.4/1 |

| No. | Average Particle Diameter of Lining Powder (μm) | Surface State after Lining | Adhesive Force (kgf/10 mm φ) | State after Durability Test |
|---|---|---|---|---|
| 13 | 100 | Good | 14 | No problem |
| 14 | 100 | " | 13 | " |
| 15 | 100 | " | 12 | " |
| 16 | 100 | Peeled | — | — |
| 17 | 500 | Good | 14 | No problem |
| 18 | 1000 | Rough | 11 | " |
| 19 | 100 | Good | 6 | " |
| 20 | 100 | " | 12 | " |
| 21 | 100 | " | 15 | " |
| 22 | 100 | " | 15 | " |
| 23 | 100 | " | 18 | " |
| 24 | 100 | " | 12 | " |

| No. | Kind of Lining Powder | Maleic Acid Modification Ratio of Maleic Acid-modified Polypropylene (%) | Propylene Content in Ethylene Propylene Rubber (%) | Weight Ratio of Maleic Acid-Modified Polypropylene/ Ethylene Propylene Rubber/ Polypropylene |
|---|---|---|---|---|
| 25 | Melted & kneaded | 0.50 | 40 | 1/0.4/1 |
| 26 | Melted & kneaded | 0.50 | 25 | 1/0.2/1 |
| 27 | Melted & kneaded | 0.50 | 25 | 1/0.025/1 |
| 28 | Melted & kneaded | 0.50 | 25 | 10/1.2/1 |
| 29 | Melted & kneaded | 0.50 | 25 | 5/0.7/1 |
| 30 | Melted & kneaded | 0.50 | 25 | 1/0.2/1 |
| 31 | Melted & kneaded | 0.50 | 25 | 1/1.2/10 |
| 32 | Melted & kneaded | 0.50 | 25 | 1/5.7/50 |
| 33 | Melted & kneaded | 0.50 | 25 | 1/12.2/100 |
| 34 | Melted & kneaded | 0.50 | 25 | 1/23.3/200 |
| 35 | Melted & kneaded | 0.50 | 25 | 1/1.2/10 |
| 36 | Melted & kneaded | 0.50 | 25 | 1/1.2/10 |

| No. | Average Particle Diameter of Lining Powder (μm) | Surface State after Lining | Adhesive Force (kgf/10 mm φ) | State after Durability Test |
|---|---|---|---|---|
| 25 | 100 | Good | 12 | No problem |
| 26 | 100 | " | 13 | " |
| 27 | 100 | " | 15 | " |
| 28 | 100 | " | 19 | " |
| 29 | 100 | " | 17 | " |
| 30 | 100 | " | 15 | " |
| 31 | 100 | " | 15 | " |
| 32 | 100 | " | 14 | " |
| 33 | 100 | " | 12 | " |
| 34 | 100 | Peeled | — | — |
| 35 | 500 | Good | 16 | No problem |
| 36 | 1000 | Rough | 12 | " |

A preferable embodiment of the inventions will be described.

The pellets of a maleic acid-modified polypropylene having a maleic acid modification ratio of from 0.01 to 1.0 wt%, the pellets of a polypropylene and the pellets of an ethylene propylene rubber having a polypropylene content of from 10 to 40% were separately milled by means of a refrigeration mill using liquid nitrogen, and each powder was classified by sieves into portions having average particle diameters of 1,000 μm, 500 μm and 100 μm. Afterward, the resulting powders were mixed with a high-molecular weight phenol-based antioxidant and another antioxidant (IRGANOX B215, made by Ciba-Geigy) containing a phosphite (or a phosphonite) in blend ratios in Table 3 to obtain lining powders.

In this connection, the antioxidant (IRGANOX B215) used herein was a mixture of pentaerythrityltetrakis[3-(3,5-di-t-butyl-4-hydroxyphenyl) propionate] and tris(2,4-di-t-butylphenyl) phosphite in a ratio of 1:2.

Furthermore, the above-mentioned maleic acid-modified polypropylene, the polypropylene, the ethylene propylene rubber and the antioxidant were mixed in blend ratios shown in Table 4, and each mixture was then kneaded by means of a melting kneader, milled by the refrigeration mill, and then classified by the sieves into portions having average particle diameters of 1,000 μm, 500 μm and 100 μm to obtain lining powders.

Next, a 70-mm-long, 200-mm-wide, 5-mm-thick carbon steel plate was degreased, shot-blasted, heated on a heated plate so that its surface temperature might be 250°±20° C., sprinkled with the above-mentioned powder, and then melted to obtain a lined steel plate having a film thickness of 1.5 mm.

Afterward, the observation of the surface state of each lining, the measurement of adhesive force by a 90° peel method in a wide of 10 mm, and a durability test for 6 months under conditions of 5% $H_2SO_4$ and 100° were carried out.

The results are set forth in Tables 3 and 4.

TABLE 3

| No. | Kind of Lining Powder | Maleic Acid Modification Ratio of Modified PP* (%) | PP Content in EPR** (%) | Melt Flow Rate of PP | Weight Ratio of Modified PP/EPR/PP |
|---|---|---|---|---|---|
| 1 | Mixed Powder | — | 25 | 0.5 | —/0.1/1.0 |
| 2 | " | 0.10 | 25 | 0.5 | 1.0/0.2/1.0 |
| 3 | " | 0.50 | 25 | 0.5 | 1.0/0.2/1.0 |
| 4 | " | 1.00 | 25 | 0.5 | 1.0/0.2/1.0 |
| 5 | " | 0.50 | 25 | 0.5 | 1.0/0.2/1.0 |
| 6 | " | 0.50 | 25 | 0.5 | 1.0/0.2/1.0 |
| 7 | " | 0.50 | 25 | 0.5 | 1.0/0.2/1.0 |
| 8 | " | 0.50 | 25 | 5.0 | 1.0/0.2/1.0 |
| 9 | " | 0.50 | 25 | 15.0 | 1.0/0.2/1.0 |
| 10 | " | 0.50 | 25 | 30.0 | 1.0/0.2/1.0 |

| No. | Amount of Antioxidant to Mixture of Modified PP, EPR and PP (%) | Average Particle Diameter of Lining Powder (μm) | Surface State after Lining | Adhesive Force (kgf/10 mm width) | State after Durability Test |
|---|---|---|---|---|---|
| 1 | 0.25 | 100 | Good | Peeled | — |
| 2 | 0.25 | 100 | " | 12 | No problem |
| 3 | 0.25 | 100 | " | 14 | " |
| 4 | 0.25 | 100 | " | 13 | " |
| 5 | — | 100 | Air bubbles | 15 | Air bubbles |
| 6 | 0.50 | 100 | Good | 15 | No problem |
| 7 | 1.00 | 100 | " | 14 | " |
| 8 | 0.25 | 100 | " | 16 | " |
| 9 | 0.25 | 100 | " | 15 | " |
| 10 | 0.25 | 100 | Partial liquid suspension | 15 | " |

| No. | Kind of Lining Powder | Maleic Acid Modification Ratio of Modified PP* (%) | PP Content in EPR** (%) | Melt Flow Rate of PP | Weight Ratio of Modified PP/EPR/PP |
|---|---|---|---|---|---|
| 11 | Mixed powder | 0.50 | 10 | 5.0 | 1.0/0.2/1.0 |
| 12 | " | 0.50 | 40 | 5.0 | 1.0/0.2/1.0 |
| 13 | " | 0.50 | 25 | 5.0 | 5.0/0.6/1.0 |
| 14 | " | 0.50 | 25 | 5.0 | 10.0/1.1/1.0 |
| 15 | " | 0.50 | 25 | 5.0 | 1.0/2.6/25.0 |
| 16 | " | 0.50 | 25 | 5.0 | 1.0/10.1/100.0 |
| 17 | " | 0.50 | 25 | 5.0 | 1.0/0.4/1.0 |
| 18 | " | 0.50 | — | 5.0 | 1.0/—/1.0 |
| 19 | " | 0.50 | 25 | 5.0 | 1.0/0.2/1.0 |
| 20 | " | 0.50 | 25 | 5.0 | 1.0/0.2/1.0 |

| No. | Amount of Antioxidant to Mixture of Modified PP, EPR and PP (%) | Average Particle Diameter of Lining Powder (μm) | Surface State after Lining | Adhesive Force (kgf/10 mm width) | State after Durability Test |
|---|---|---|---|---|---|
| 11 | 0.25 | 100 | Good | 14 | No problem |
| 12 | 0.25 | 100 | " | 16 | " |
| 13 | 0.25 | 100 | " | 18 | " |
| 14 | 0.25 | 100 | " | 17 | " |
| 15 | 0.25 | 100 | " | 15 | " |
| 16 | 0.25 | 100 | " | 14 | " |
| 17 | 0.25 | 100 | " | 15 | " |
| 18 | 0.25 | 100 | " | 2 | Peeled |
| 19 | 0.25 | 500 | " | 14 | No problem |
| 20 | 0.25 | 1000 | Rough | 15 | Rough |

Note
*means a polypropylene, and
**means an ethylene propylene rubber.

TABLE 4

| No. | Kind of Lining Powder | Maleic Acid Modification Ratio of Modified PP* (%) | PP Content in EPR** (%) | Melt Flow Rate of PP | Weight Ratio of Modified PP/EPR/PP | Amount of Antioxidant to Mixture of Modified PP, EPR and PP (%) | Average Particle Diameter of Lining Powder (μm) | Surface State after Lining | Adhesive Force (kgf/10 mm width) | State after Durability Test |
|---|---|---|---|---|---|---|---|---|---|---|
| 21 | Melted & kneaded | — | 25 | 0.5 | —/0.1/1.0 | 0.25 | 100 | Good | Peeled | — |
| 22 | " | 0.10 | 25 | 0.5 | 1.0/0.2/1.0 | 0.25 | 100 | " | 14 | No problem |
| 23 | " | 0.50 | 25 | 0.5 | 1.0/0.2/1.0 | 0.25 | 100 | " | 17 | " |
| 24 | " | 1.00 | 25 | 0.5 | 1.0/0.2/1.0 | 0.25 | 100 | " | 16 | " |
| 25 | " | 0.50 | 25 | 0.5 | 1.0/0.2/1.0 | — | 100 | Rough | 16 | " |
| 26 | " | 0.50 | 25 | 0.5 | 1.0/0.2/1.0 | 0.50 | 100 | Good | 17 | " |
| 27 | " | 0.50 | 25 | 0.5 | 1.0/0.2/1.0 | 1.00 | 100 | " | 17 | " |
| 28 | " | 0.50 | 25 | 5.0 | 1.0/0.2/1.0 | 0.25 | 100 | " | 18 | " |
| 29 | " | 0.50 | 25 | 15.0 | 1.0/0.2/1.0 | 0.25 | 100 | " | 17 | " |
| 30 | " | 0.50 | 25 | 30.0 | 1.0/0.2/1.0 | 0.25 | 100 | Partial liquid suspension | 18 | " |
| 31 | Melted & kneaded | 0.50 | 10 | 5.0 | 1.0/0.2/1.0 | 0.25 | 100 | Good | 17 | No problem |
| 32 | " | 0.50 | 40 | 5.0 | 1.0/0.2/1.0 | 0.25 | 100 | " | 18 | " |
| 33 | " | 0.50 | 25 | 5.0 | 5.0/0.6/1.0 | 0.25 | 100 | " | 20 | " |
| 34 | " | 0.50 | 25 | 5.0 | 10.0/1.1/1.0 | 0.25 | 100 | " | 18 | " |
| 35 | " | 0.50 | 25 | 5.0 | 1.0/2.6/25.0 | 0.25 | 100 | " | 17 | " |
| 36 | " | 0.50 | 25 | 5.0 | 1.0/10.1/100.0 | 0.25 | 100 | " | 17 | " |
| 37 | " | 0.50 | 25 | 5.0 | 1.0/0.4/1.0 | 0.25 | 100 | " | 18 | " |
| 38 | " | 0.50 | — | 5.0 | 1.0/—/1.0 | 0.25 | 100 | " | 3 | Peeled |
| 39 | " | 0.50 | 25 | 5.0 | 1.0/0.2/1.0 | 0.25 | 100 | " | 17 | No problem |
| 40 | " | 0.50 | 25 | 5.0 | 1.0/0.2/1.0 | 0.25 | 100 | " | 17 | " |

Note:
* means a polypropylene, and ** means an ethylene propylene rubber.

A preferable embodiment of the inventions will be described.

EXAMPLE 1

The pellets of a maleic acid-modified polypropylene having a maleic acid modification ratio of from 0.01 to 1.0 wt%, the pellets of a polypropylene, the pellets of an ethylene propylene rubber having a polypropylene content of from 10 to 40%, a high-molecular weight phenol-based antioxidant and another antioxidant (IRGANOX B215, made by Ciba-Geigy) containing a phosphite (or a phosphonite) were mixed with in blend ratios shown in Tables 5 and 6, and each mixture was then kneaded by means of a melting kneader, and then molded by the use of a sheet molding machine to obtain sheets having film thicknesses of 200 μm, 500 μm, 1,000 μm and 2,000 μm.

In this connection, the antioxidant (IRGANOX B215) used herein was a mixture of pentaerythrityltetrakis[3-(3,5-di-t-butyl-4-hydroxyphenyl) propionate] and tris(2,4-di-t-butylphenyl) phosphite in a ratio of 1:2.

Next, a 70-mm-long, 200-mm-wide, 5-mm-thick carbon steel plate was decreased, shot-blasted, and then heated on a heated plate so that its surface temperature might be 250°±20° C., and the above-mentioned sheet was pressed against the heated steel plate to fuse it thereon, thereby obtaining the steel plate lined with the polypropylene sheet.

Afterward, the observation of the surface state of each sheet lining, the measurement of adhesive force by a 90° peel method in a wide of 10 mm, and a durability test for 6 months under conditions of 5% $H_2SO_4$ and 100° were carried out.

The results are set forth in Table 5.

TABLE 5

| No. | Maleic Acid Modification Ratio of Modified PP* (%) | PP Content in EPR** (%) | Melt Flow Rate of PP | Modified PP/EPR/PP (weight ratio) | Amount of Antioxidant to Mixture of Modified PP, EPR and PP (%) | Thickness of Sheet of PP Resin Composition (μm) | Surface State of Lining | Adhesive Force (kgf/10 mm width) | State after Durability Test |
|---|---|---|---|---|---|---|---|---|---|
| 1 | — | 25 | 0.5 | —/0.1/1.0 | 0.25 | 500 | Metal surface peeled | Peeled | — |
| 2 | 0.10 | 25 | 0.5 | 1.0/0.2/1.0 | 0.25 | 500 | Uniform and good | 14 | No problem |
| 3 | 0.50 | 25 | 0.5 | 1.0/0.2/1.0 | 0.25 | 500 | " | 12 | " |
| 4 | 1.00 | 25 | 0.5 | 1.0/0.2/1.0 | 0.25 | 500 | " | 13 | " |
| 5 | 0.50 | 25 | 0.5 | 1.0/0.2/1.0 | — | 500 | Air bubbles | 13 | Air bubbles |
| 6 | 0.50 | 25 | 0.5 | 1.0/0.2/1.0 | 0.50 | 500 | Uniform and good | 14 | No problem |
| 7 | 0.50 | 25 | 0.5 | 1.0/0.2/1.0 | 1.00 | 500 | " | 14 | " |
| 8 | 0.50 | 25 | 5.0 | 1.0/0.2/1.0 | 0.25 | 500 | " | 15 | " |
| 9 | 0.50 | 25 | 15.0 | 1.0/0.2/1.0 | 0.25 | 500 | " | 16 | " |
| 10 | 0.50 | 25 | 30.0 | 1.0/0.2/1.0 | 0.25 | 500 | " | 16 | " |
| 11 | 0.50 | 10 | 5.0 | 1.0/0.2/1.0 | 0.25 | 500 | Uniform and good | 15 | No problem |
| 12 | 0.50 | 40 | 5.0 | 1.0/0.2/1.0 | 0.25 | 500 | " | 15 | " |
| 13 | 0.50 | 25 | 5.0 | 5.0/0.6/1.0 | 0.25 | 500 | " | 16 | " |
| 14 | 0.50 | 25 | 5.0 | 10.0/1.1/1.0 | 0.25 | 500 | " | 16 | " |

TABLE 5-continued

| No. | Maleic Acid Modification Ratio of Modified PP* (%) | PP Content in EPR** (%) | Melt Flow Rate of PP | Modified PP/EPR/PP (weight ratio) | Amount of Antioxidant to Mixture of Modified PP, EPR and PP (%) | Thickness of Sheet of PP Resin Composition (μm) | Surface State of Lining | Adhesive Force (kgf/10 mm width) | State after Durability Test |
|---|---|---|---|---|---|---|---|---|---|
| 15 | 0.50 | 25 | 5.0 | 1.0/2.6/25.0 | 0.25 | 500 | " | 17 | " |
| 16 | 0.50 | 25 | 5.0 | 1.0/10.1/100.0 | 0.25 | 500 | " | 14 | " |
| 17 | 0.50 | 25 | 5.0 | 1.0/0.4/1.0 | 0.25 | 500 | " | 14 | " |
| 18 | 0.50 | — | 5.0 | 1.0/—/1.0 | 0.25 | 500 | Partially peeled | 2 | Peeled |
| 19 | 0.50 | 25 | 5.0 | 1.0/0.2/1.0 | 0.25 | 200 | Uniform and good | 15 | No problem |
| 20 | 0.50 | 25 | 5.0 | 1.0/0.2/1.0 | 0.25 | 1000 | " | 16 | " |
| 21 | 0.50 | 25 | 5.0 | 1.0/0.2/1.0 | 0.25 | 2000 | " | 15 | " |

Note:
* means a polypropylene, and ** means an ethylene propylene rubber.

EXAMPLE 2

The pellets of a maleic acid-modified polypropylene having a maleic acid modification ratio of from 0.01 to 1.0 wt%, the pellets of a polypropylene, the pellets of an ethylene propylene rubber having a polypropylene content of from 10 to 40%, a high-molecular weight phenol-based antioxidant and another antioxidant (IRGANOX B215) containing a phosphite (or a phosphonite) were mixed with in blend ratios shown in Table 6. Each mixture was then kneaded by means of a melting kneader, and then extruded through a cylinder head to obtain strands, and sticks were prepared from the strand.

Next, a 70-mm-long, 200-mm-wide, 5-mm-thick carbon steel plate was degreased, shot-blasted, and then heated on a heated plate so that its surface temperature might be 250°±20° C., and the above-mentioned stick was pressed against the heated steel plate to fuse it thereon, thereby obtaining the steel plate lined with the polypropylene.

Afterward, the observation of the surface state of each lining, the measurement of adhesive force by a 90° peel method in a wide of 10 mm, and a durability test for 6 months under conditions of 5% $H_2SO_4$ and 100° were carried out.

The results are set forth in Table 6.

TABLE 6

| No. | Maleic Acid Modification Ratio of Modified PP* (%) | PP Content in EPR** (%) | Melt Flow Rate of PP | Modified PP/EPR/PP (weight ratio) | Amount of Antioxidant to Mixture of Modified PP, EPR and PP (%) | Size of Stick of PP Resin Composition (mm) | Surface State of Lining | Adhesive Force (kgf/10 mm width) | State after Durability Test |
|---|---|---|---|---|---|---|---|---|---|
| 22 | 0.50 | 25 | 0.5 | 1.0/0.2/1.0 | 0.25 | 3 | Good | 15 | No problem |
| 23 | 0.50 | 25 | 5.0 | 1.0/0.2/1.0 | 0.25 | 3 | " | 14 | " |
| 24 | 0.50 | 25 | 15.0 | 1.0/0.2/1.0 | 0.25 | 3 | " | 16 | " |
| 25 | 0.50 | 25 | 30.0 | 1.0/0.2/1.0 | 0.25 | 3 | " | 14 | " |

* means a polypropylene, and ** means an ethylene propylene rubber.

A preferable embodiment of the inventions will be described in reference to FIG. 1.

In FIG. 1, reference numeral 1 is a metal matrix (carbon steel) having a diameter of 120 mm and a thickness of 5 mm in which the surface of the metal matrix is cleaned by degreasing, washing and blasting, numeral 2 is a maleic acid-modified polypropylene film formed by heating/melting (250°±20° C.) a maleic acid-modified powder having a melt index of 10 and an average diameter of 100 μm on the surface of the metal matrix 1. Numeral 3 is a polypropylene film formed by heating/melting (250°±20° C.) a polypropylene powder having a melt index of 5 and an average diameter of 100 μm on the maleic acid-modified polypropylene film 2. The formation of the polypropylene film 3 can be carried out at a time when the previously formed maleic acid-modified polypropylene film 2 is still in a melted state or in a cooled/solidified state. In Table 7, there are shown the results of the adhesive force and the durability test (for 6 months under conditions of 5% sulfuric acid and 100° C.) of the polypropylene lining materials which lining has been made by two methods of the present invention.

TABLE 7

| No. | Thickness of Film of 0.05% Maleic Acid-Modified Polypropylene (μm) | Thickness of Film of 0.5% Maleic Acid-Modified Polypropylene (μm) | Thickness of Film of 1.0% Maleic Acid-Modified Polypropylene (μm) | Thickness of Film of 0.01% Maleic Acid-Modified Polypropylene (μm) | Thickness of Polypropylene Film (μm) | Surface State after Lining | Adhesive Force after Lining (kgf/10 mm width) | State after Durability Test |
|---|---|---|---|---|---|---|---|---|
| 1 | None | None | None | None | 2000 | Peeled from metal surface | — | — |
| 2 | None | None | None | None | 200 | Peeled from metal surface | — | — |
| 3 | 200 | None | None | None | 1000 | Uniform & good | 7 | No problem |
| 4 | None | 50 | None | None | 2000 | " | 12 | " |
| 5 | None | 200 | None | None | 2000 | " | 11 | " |
| 6 | None | 500 | None | None | 2000 | " | 10 | " |
| 7 | None | 1000 | None | None | 1000 | " | 10 | Wavy wrinkles occured slightly |
| 8 | None | 2000 | None | None | 500 | Wrinkles occured slightly on polypropylene film layer | 10 | Wavy wrinkles occured slightly |
| 9 | None | None | 200 | None | 1000 | Uniform & good | 12 | No problem |
| 10 | None | None | None | 200 | 1000 | " | 2 | Peeled |

We claim:

1. A method for preventing corrosion of a metal piece under severe operating conditions comprising the steps of obtaining a metal piece whose surface will come into contact with a corrosive fluid of an exhaust gas desulfurization device, a gas purification plant, a seawater-fresh water converter or a thermal power plant, sprinkling the surface of the metal piece with a polypropylene lining powder which comprises a mixture of a maleic acid-modified polypropylene powder having an average particle diameter of 100 to 500 μm and having a maleic acid modification ratio of from 0.05 to 1.0 wt% and a polypropylene powder having an average particle diameter of 100 to 500 μm in a weight ratio of the maleic acid-modified polypropylene powder/the polypropylene powder=1/1 to 1/10, heating/melting the polypropylene lining powder, and then cooling/solidifying the same to form a lining layer of the polypropylene.

2. A method of claim 1 including the step of placing the surface of the metal piece into contact with the corrosive fluid at a temperature of about 100° C.

3. A method for preventing corrosion of a metal piece under severe operating conditions comprising the steps of obtaining a metal piece whose surface will come into contact with a corrosive fluid of an exhaust gas desulfurization device, a gas purification plant, a seawater-fresh water converter or a thermal power plant, sprinkling the surface of the metal piece with a polypropylene lining powder having an average particle diameter of 100 to 500 μm which comprises a maleic acid-modified polypropylene having a maleic acid modification ratio of from 0.05 to 1.0 wt% and a polypropylene in a weight ratio of the maleic acid-modified polypropylene/the polypropylene=1/1 to 1/10, heating/melting the polypropylene lining powder, and then cooling/solidifying the same to form a lining layer of the polypropylene.

4. A method of claim 3 including the step of placing the surface of the metal piece into contact with the corrosive fluid at a temperature of about 100° C.

* * * * *